US011113159B2

(12) United States Patent
Zhang et al.

(10) Patent No.: US 11,113,159 B2
(45) Date of Patent: Sep. 7, 2021

(54) LOG STRUCTURE WITH COMPRESSED KEYS

(71) Applicant: Intel Corporation, Santa Clara, CA (US)

(72) Inventors: Zhiyuan Zhang, Beijing (CN); Xiangbin Wu, Beijing (CN); Xinxin Zhang, Beijing (CN); Qianying Zhu, Beijing (CN); Haitao Ji, Beijing (CN); Yingzhe Shen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/616,905

(22) PCT Filed: Jun. 30, 2017

(86) PCT No.: PCT/CN2017/090983
§ 371 (c)(1),
(2) Date: Nov. 25, 2019

(87) PCT Pub. No.: WO2019/000355
PCT Pub. Date: Jan. 3, 2019

(65) Prior Publication Data
US 2020/0159629 A1    May 21, 2020

(51) Int. Cl.
*G06F 11/14* (2006.01)
*G06F 12/16* (2006.01)
(Continued)

(52) U.S. Cl.
CPC ...... *G06F 11/1471* (2013.01); *G06F 11/1435* (2013.01); *G06F 11/1451* (2013.01);
(Continued)

(58) Field of Classification Search
CPC .. G06F 11/3476; G06F 17/40; G06F 11/1471; G06F 16/22–2291;
(Continued)

(56) References Cited

U.S. PATENT DOCUMENTS 8,806,115 B1 *   8/2014  Patel ............... G06F 3/0688
                                                          711/103
9,141,554 B1 *   9/2015  Candelaria ........ H03M 7/3091
(Continued)

FOREIGN PATENT DOCUMENTS

CN    105027090 A    11/2015
CN    105574104 A    5/2016
CN    105608224 A    5/2016

OTHER PUBLICATIONS

International Search Report and Written Opinion for International Patent Application No. PCT/CN2017/090983, dated Apr. 4, 2018, 8 pages.

*Primary Examiner* — Idriss N Alrobaye
*Assistant Examiner* — Sakhr A Aldaylam
(74) *Attorney, Agent, or Firm* — Jordan IP Law, LLC

(57) ABSTRACT

An embodiment of a memory apparatus may include a logger to log memory access data in persistent storage media, a log indexer communicatively coupled to the logger to index the memory access log data in an index table in a system memory, and a key compressor communicatively coupled to the log indexer to compress an index key for the index table. Other embodiments are disclosed and claimed.

20 Claims, 7 Drawing Sheets

(51) Int. Cl.
   *G06F 17/40* (2006.01)
   *H04L 9/06* (2006.01)
   *H04L 9/08* (2006.01)
   *H04L 9/14* (2006.01)

(52) U.S. Cl.
   CPC .......... *G06F 11/1469* (2013.01); *G06F 12/16* (2013.01); *G06F 17/40* (2013.01); *H04L 9/0643* (2013.01); *H04L 9/0819* (2013.01); *H04L 9/0861* (2013.01); *H04L 9/14* (2013.01)

(58) Field of Classification Search
   CPC ........... G06F 16/31–328; H04L 9/0643; H04L 9/3236–3242; H04L 9/08–0858
   See application file for complete search history.

(56) References Cited

U.S. PATENT DOCUMENTS

| | | | |
|---|---|---|---|
| 2009/0177799 A1* | 7/2009 | Fitzek | H03M 7/4006 709/247 |
| 2011/0227790 A1* | 9/2011 | Li | G01S 1/042 342/386 |
| 2011/0276781 A1* | 11/2011 | Sengupta | G06F 16/137 711/216 |
| 2014/0019680 A1* | 1/2014 | Jin | G11B 5/012 711/112 |
| 2014/0101369 A1 | 4/2014 | Tomlin et al. | |

* cited by examiner

LOG STRUCTURE WITH COMPRESSED KEYS

CROSS REFERENCE TO RELATED APPLICATIONS

The present application is a U.S. National Phase Patent Application, which claims the benefit of priority to International Patent Application No. PCT/CN2017/090983 filed on Jun. 30, 2017.

TECHNICAL FIELD

Embodiments generally relate to memory systems. More particularly, embodiments relate to a log structure with compressed keys.

BACKGROUND

Memory and storage systems may utilize various arrangements for accessing data stored on the system. Some storage systems may use a B–tree, a B+tree, or a lock-structured merge (LSM)-tree data structure to store data.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile memory. Nonvolatile memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Figure 1:
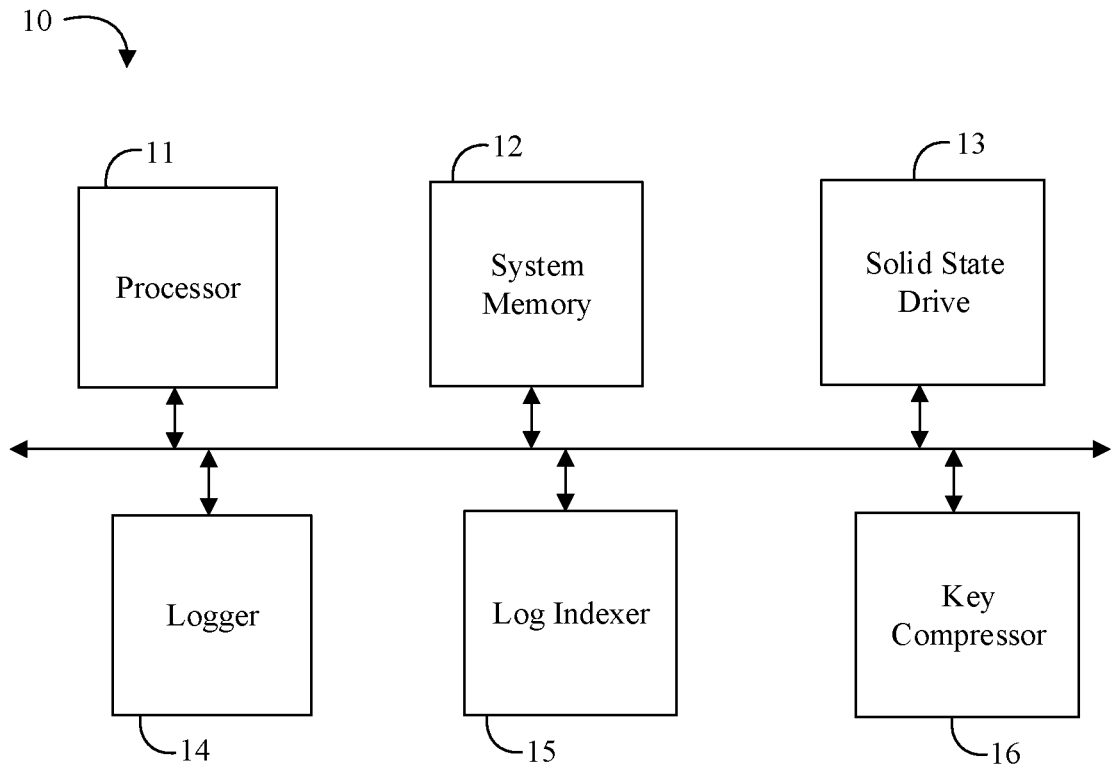
FIG. 1 is a block diagram of an example of an electronic processing system according to an embodiment.

Turning now to FIG. 1, an embodiment of an electronic processing system may include a processor 11, a system memory 12 communicatively coupled to the processor 11, a solid state drive (SSD) 13 communicatively coupled to the processor 11, a logger 14 communicatively coupled to the processor 11 and the SSD 13 to log memory access data in the SSD 13, a log indexer 15 communicatively coupled to the logger 14 to index the memory access log data in the system memory 12 in an index table, and a key compressor 16 communicatively coupled to the log indexer 15 to compress an index key for the index table. For example, the SSD 13 may be coupled to the processor 11 through an input/output (IO) interface such as PCI EXPRESS (PCIe), NVM EXPRESS (NVMe), etc., and the logger 14, the log indexer 15, and the key compressor 16 may be included in a SSD controller. In an embodiment, the persistent storage media in the SSD 13 is a non-volatile memory, for example, NAND memory. In some embodiments, the logger may be configured to maintain the memory access log data in a circular log, and/or to store metadata and value information for key-value pairs sequentially in a full disk log. As discussed in more detail below, the index table stored in the system memory 12 may include entries for all key-value pairs in the circular log. In some embodiments, the compressed index key may include a hash of a full key. In any of the embodiments described herein, the key compressor may be further configured to identify a conflict in two or more compressed index keys, and combine key-value pairs corresponding to the conflicted compressed index keys into a new entry. In some embodiments, the system memory 12 may include any of NVM and/or volatile memory.

Embodiments of each of the above processor 11, system memory 12, SSD 13, logger 14, log indexer 15, key compressor 16, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as RAM, read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the system memory 12, SSD 13, other persistent storage media, or other memory may store a set of instructions which when executed by the processor 11 cause the system 10 to implement one or more components, features, or aspects of the system 10 (e.g., the logger 14, the log indexer 15, the key compressor 16, etc.).

Figure 2:
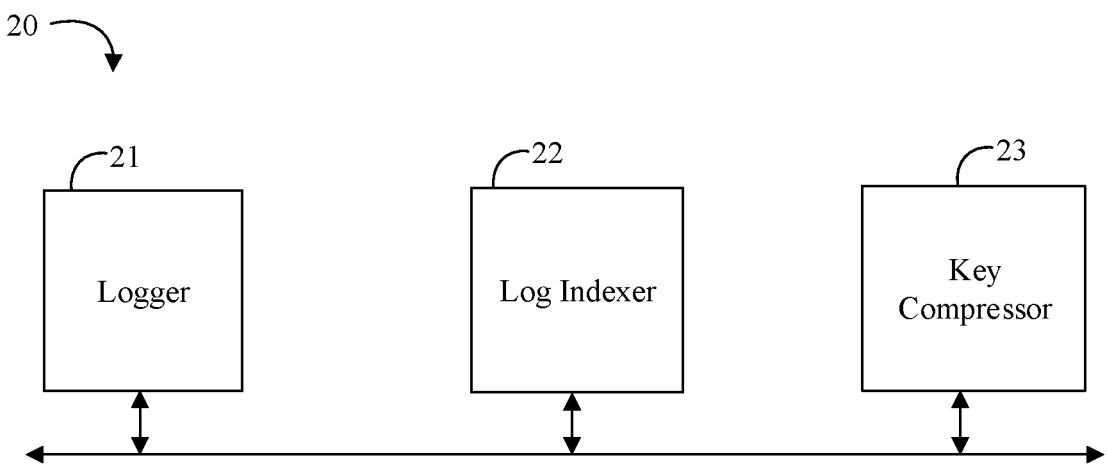
FIG. 2 is a block diagram of an example of a memory apparatus according to an embodiment.

Turning now to FIG. 2, an embodiment of a memory apparatus 20 may include a logger 21 to log memory access data in persistent storage media, a log indexer 22 communicatively coupled to the logger 21 to index the memory access log data in an index table in a system memory, and a key compressor 23 communicatively coupled to the log indexer 22 to compress an index key for the index table. In some embodiments, the logger 21 may be configured to maintain the memory access log data in a circular log, and/or to store metadata and value information for key-value pairs sequentially in a full disk log. The index table may advantageously include entries for all key-value pairs in the circular log in the system memory. In some embodiments, the compressed index key may include a hash of a full key. The key compressor may also be configured to identify a conflict in two or more compressed index keys, and combine key-value pairs corresponding to the conflicted compressed index keys into a new entry.

In various embodiments, any useful compression technique may be utilized to compress the full key into a compressed index keys. Non-limiting examples of suitable compression techniques include Lempel-Ziv (LZ) compression, DEFLATE, Lempel-Ziv-Welch (LZW) compression, etc. Some embodiments may utilize a hash function to create a hash key for the compressed index key. In general terms, a hash function may include any deterministic function that maps data of an arbitrary size to fixed size data (e.g., a 64-bit hash key). Any useful hash function may be utilized to provide the hash key. Non-limiting examples of suitable hash functions include cyclic redundancy checks (CRC), checksums, universal hash functions, non-cryptographic hash functions, etc.

Embodiments of each of the above logger 21, log indexer 22, key compressor 23, and other components of the apparatus 20 may be implemented in hardware, software, or any combination thereof. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Alternatively, or additionally, these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
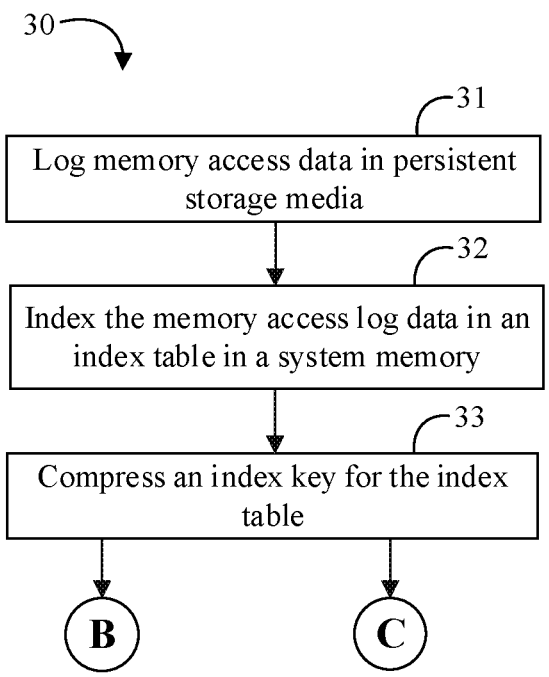
FIGS. 3A to 3C are flowcharts of an example of a method of logging memory information according to an embodiment.
Figure 3B:
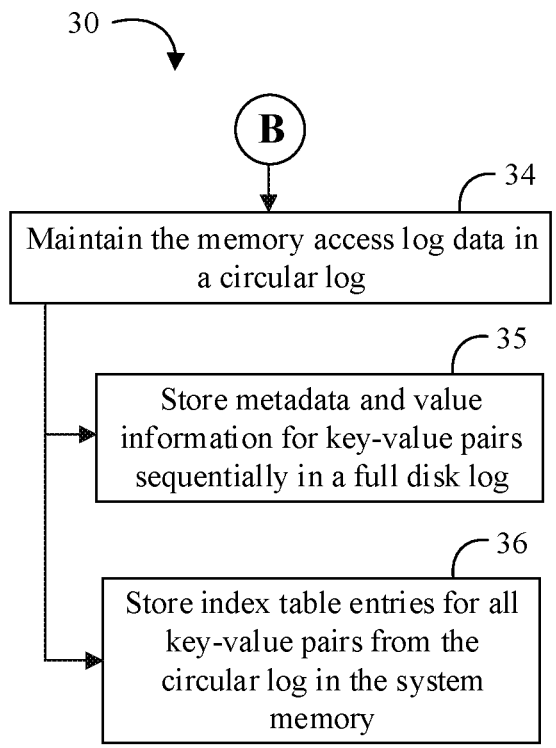
Figure 3C:
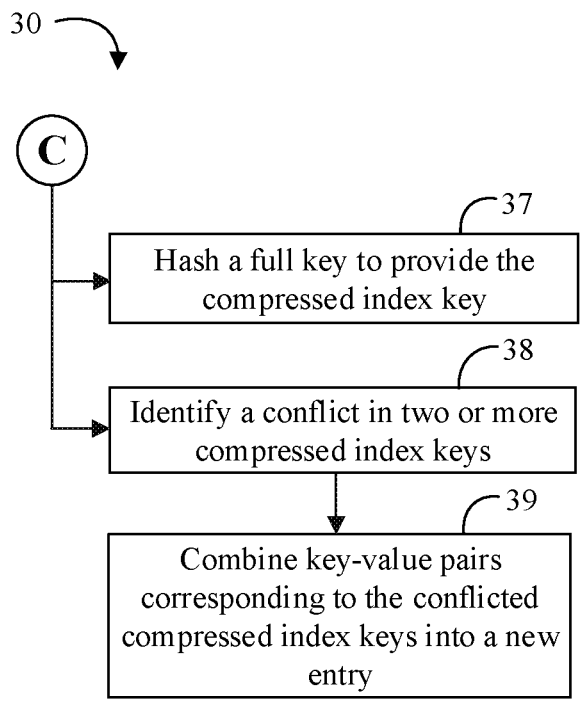

Turning now to FIGS. 3A to 3C, an embodiment of a method 30 of logging memory information may include logging memory access data in persistent storage media at block 31, indexing the memory access log data in an index table in a system memory at block 32, and compressing an index key for the index table at block 33. The method 30 may further include maintaining the memory access log data in a circular log at block 34. For example, the method 30 may include storing metadata and value information for key-value pairs sequentially in a full disk log at block 35, and/or storing index table entries for all key-value pairs from the circular log in the system memory at block 36. Some embodiments of the method 30 may include hashing a full key to provide the compressed index key at block 37. The method 30 may also include identifying a conflict in two or more compressed index keys at block 38, and combining key-value pairs corresponding to the conflicted compressed index keys into a new entry at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages. For example, the method 30 may be implemented on a computer readable medium as described in connection with Examples 19 to 24 below. For example, embodiments or portions of the method 30 may be implemented in applications (e.g., through an application programming interface (API)) or driver software running on an operating system (OS).

Some other object storage systems may utilize a B-tree, a B+tree, or a LSM-tree data structure to store data to persistent storage media. Because the data set may be far larger than the system memory size in the other object storage systems, some requests may need multiple random disk read and write operations to be performed.

Advantageously, some embodiments may improve a worst case latency and may improve input/output operations per second (IOPS) performance by ensuring that all requests may be served within a single disk access and remove most or all random disk write operations. Some embodiments may advantageously provide a log structure for an object store and/or key-value (K-V) storage with an in-memory index. For example, some embodiments may provide a log structure for key-value storage with an in-memory index table and a full disk log data structure. Some embodiments may utilize a key's hash value (e.g., a 64-bit hash value of the full key) as the index instead of the full key index used in other key-value storage systems. For example, in other systems the full key size may be a variable size of hundreds of bytes to kilobytes. Because the hash size may much smaller than the full key size, some embodiments may advantageously provide a smaller index table.

In some embodiments, a full index table of all K-V pairs may be stored in system memory. For example, the index table may include the compressed key (HASH(KEY)), an offset from the logical block address (LBA. OFFSET), and a length of the entry indexed by HASH(KEY). In another example, the index table may also include one or more pointers and/or status information. In some embodiments, a self-balancing binary search tree may be used to store the in-memory index table. In one embodiments, 32 bytes of memory may be used for each in-memory index table entry (e.g., for two pointers, HASH(KEY), LBA, offset, length, and status). For a 2TB SSD and 4K-byte K-V entry size, 18 GB memory may be used to store the in-memory index table (e.g., 32 bytes*512M for data plus 4 bytes*512M for a free memory circular buffer).

Because the index table is fully located in system memory, some embodiments may advantageously store the metadata and value of each K-V pair sequentially into a full disk log. The log data structure may ensure that all write access may be sequentially appended to a tail of the circular log. For a NAND-based SSD, for example, which may have much lower random write performance than sequential write performance, some embodiments may improve or optimize both system IOPS performance and latency. For example, as compared to a B+tree or LSM-tree arrangement, some embodiments may ensure a single disk access to all read requests and most write accesses, and may provide deterministic latency performance.

Figure 4:
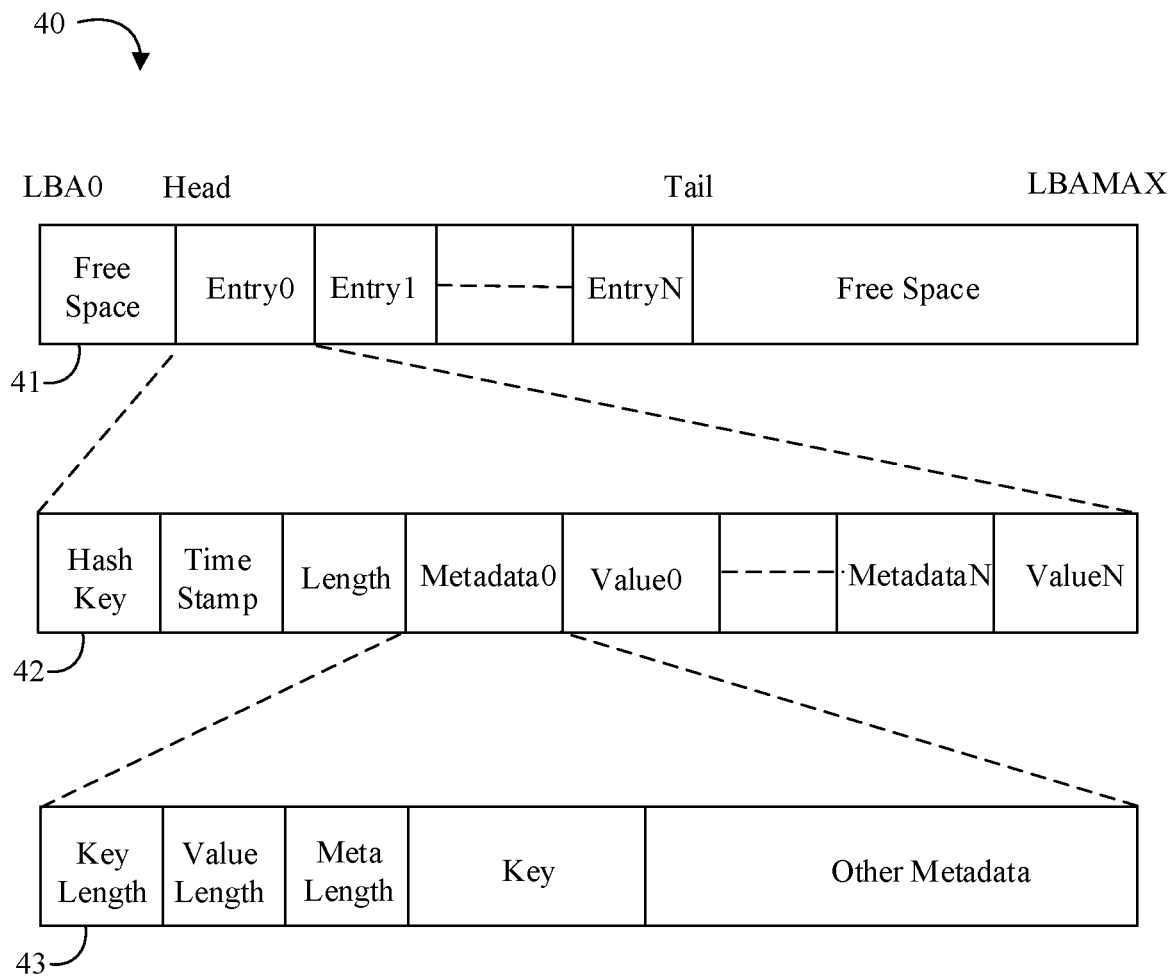
FIG. 4 is an illustrative diagram of an example of a memory arrangement according to an embodiment.

Turning now to FIG. 4, an embodiment of a memory arrangement 40 may include a circular log 41 which includes entries 0 through N between a head and a tail of the circular log 41. For example, the circular log 41 occupies storage space on a persistent storage media between LBA0 and LBAMAX. The memory arrangement 40 may further include an index table 42 indexed by a hash key (e.g., a hash value of the full key). For example, the index table 42 may be stored in system memory. The hash key and the disk addresses of all entries of the index table 42 may be stored in a self-balancing binary tree indexed by HASH(KEY). The fields of each entry of the index table 42 may include, for example, the hash key, namespace.LBA.Offset, length, etc. For example, the namespace.LBA.Offset field may be where the metadata and value of the full key is stored on the persistent storage media (e.g., with full key data structure 43). The length field may be the total size of entry indexed by the hash key.

On the persistent storage media, all of the data may be arranged in a circular log. Incoming K-V pairs and metadata may be combined and appended to the tail of the log. In the event that multiple keys have conflicted hash values, all of the conflicted K-V pairs may be combined to a new entry and appended to the tail of the log. For example, if a 64-bit HASH(KEY) is used for the compressed index key and 512M entries are stored in a 2TB disk, the HASH(KEY) collision probability may be less than $2\exp-33$. Accordingly, any overhead in handling compressed key conflicts to may be relatively insubstantial.

Figure 5:
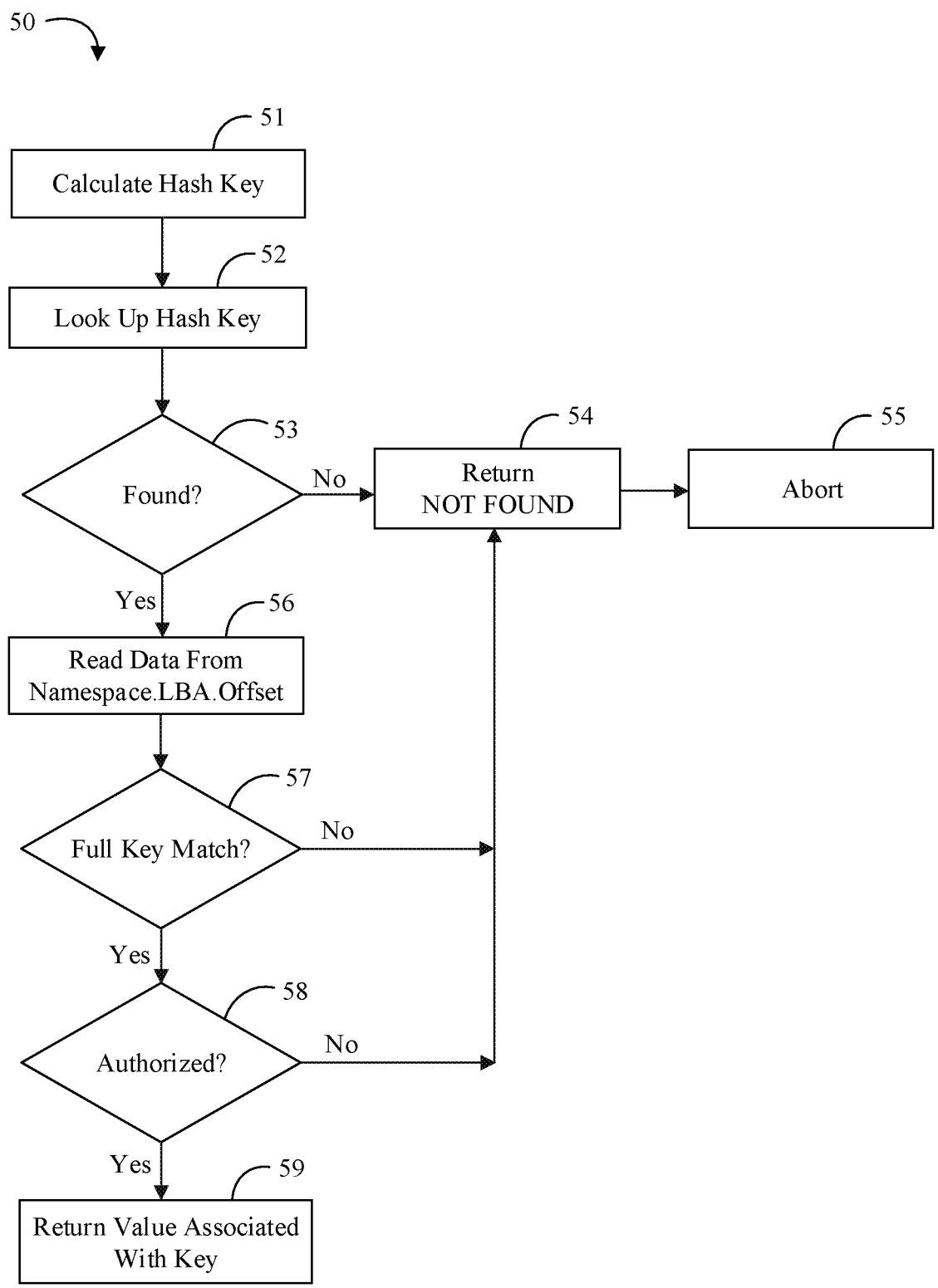
FIG. 5 is a flowchart of an example of a method of performing a GET(KEY) operation according to an embodiment.

Turning now to FIG. 5, an embodiment of a method 50 of performing a GET(KEY) operation may calculate a hash key (e.g., a hash function of a full key) to use as an index to a memory binary tree at block 51, and look up the hash key in the memory binary tree at block 52. If the hash key is not found at block 53, the method 50 may return NOT FOUND at block 54 and abort at block 55. If the hash key is found at block 53, the method 50 may read data from memory according to the corresponding Namespace.LBA.Offset and Length fields from the memory binary tree at block 56. The method 50 may then check metadata to determine if the full key matches the client's request at block 57 and check the client's authorization at block 58. If the full key does not match at block 57, the method 50 may return NOT FOUND at block 54 and abort at block 55. If the client is not authorized at block 58, the method 50 may return NOT FOUND at block 54 and abort at block 55. If the full key matches at block 57 and the client is authorized at block 58, then the method 50 may return the value associated with the full key to the client at block 59.

Figure 6:
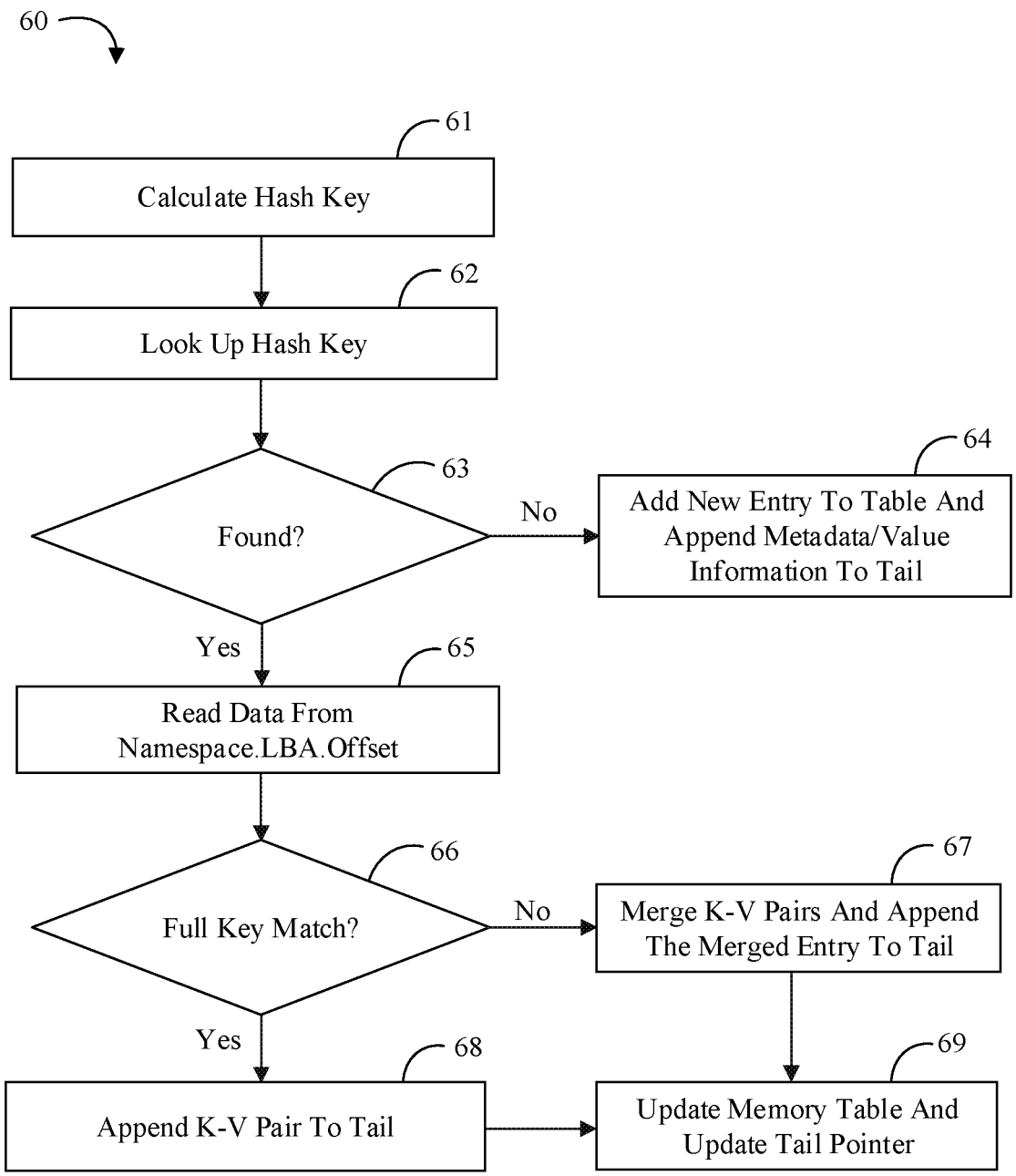
FIG. 6 is a flowchart of an example of a method of performing an UPDATE(KEY) operation according to an embodiment.

Turning now to FIG. 6, an embodiment of a method 60 of performing an UPDATE(KEY) operation may calculate the hash key at block 61 and look up the hash key in memory at block 62. If the hash key is not found at block 63, the method 60 may add a new entry to the memory table and append metadata and/or value information to a tail of a disk log at block 64. If the hash key is found at block 63, the method 60 may read data from memory according to the corresponding Namespace.LBA.Offset and Length fields at block 65. The method 60 may then check metadata to determine if the full key matches the client's request (e.g., and if the client is authorized) at block 66. If the full key does not match at block 66, the method 60 may merge the client request K-V pair into the original entry read from disk, and append the merged entry to the log tail at block 67. If the full key matches at block 66, the method 60 may append the client request K-V pair to the log tail at block 68. After either block 67 or block 68, the method 60 may then update the memory table for the hash key, and update the log tail pointer at block 69.

Figure 7:
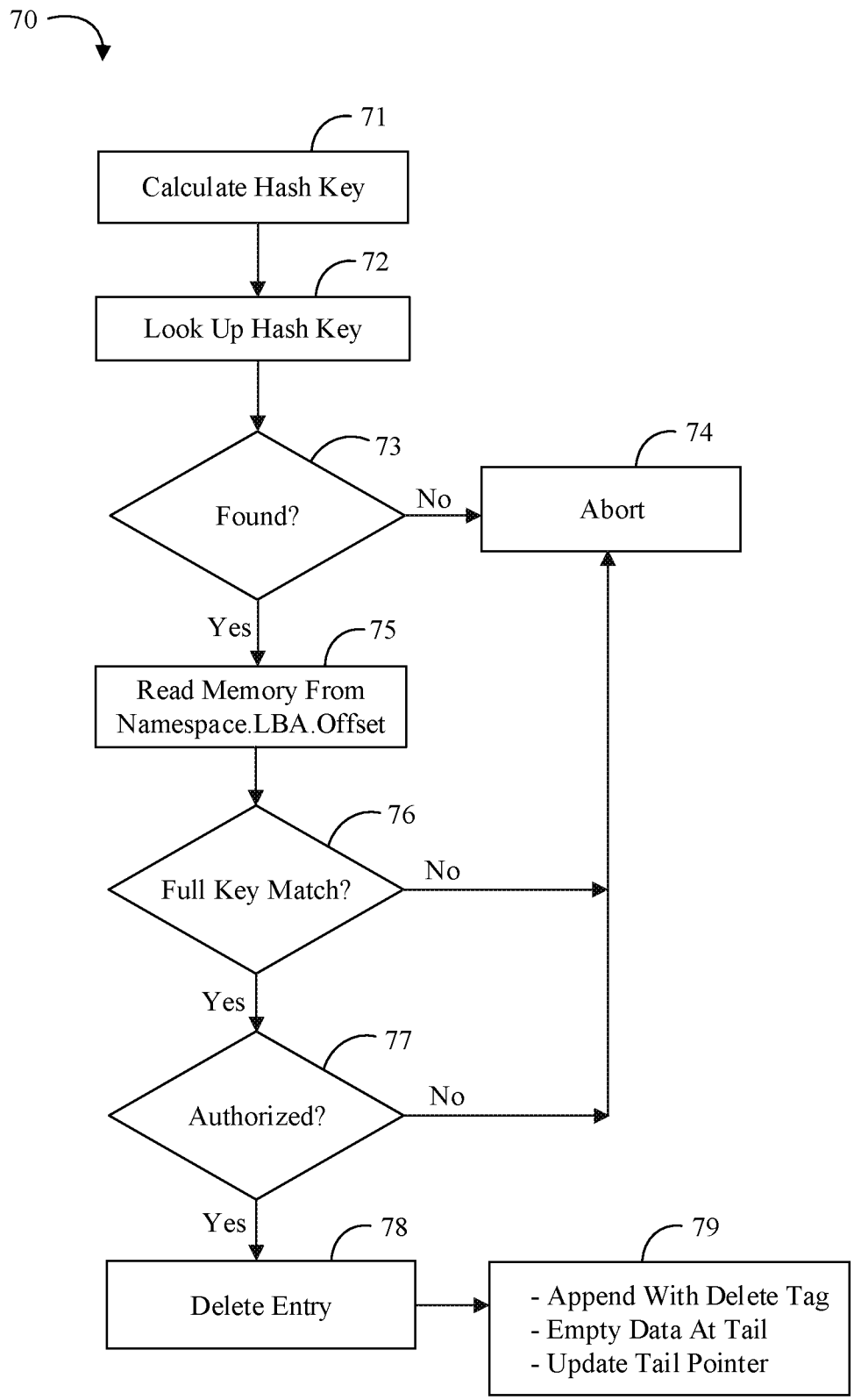
FIG. 7 is a flowchart of an example of a method of performing a DELETE(KEY) operation according to an embodiment.

Turning now to FIG. 7, an embodiment of a method 70 of performing a DELETE(KEY) operation may calculate the hash key at block 71 and look up the hash key in the memory binary tree at block 72. If the hash key is not found at block 73, the method 70 may abort at block 74. If the hash key is found at block 73, the method 70 may then read data from memory according to the corresponding Namespace.LBA.Offset and Length fields in the memory binary tree at block 75. The method 70 may then check metadata to determine if the full key matches the client request at block 76 and check the client's authorization at block 77. If either of the checks at blocks 76 or 77 fails, the method 70 may abort at block 74. If both checks are successful, the method 70 may delete the corresponding entry from the memory binary tree at block 78, and append the full key metadata with a delete tag, empty data at the log tail, and update the log tail pointer at block 79.

Figure 8:
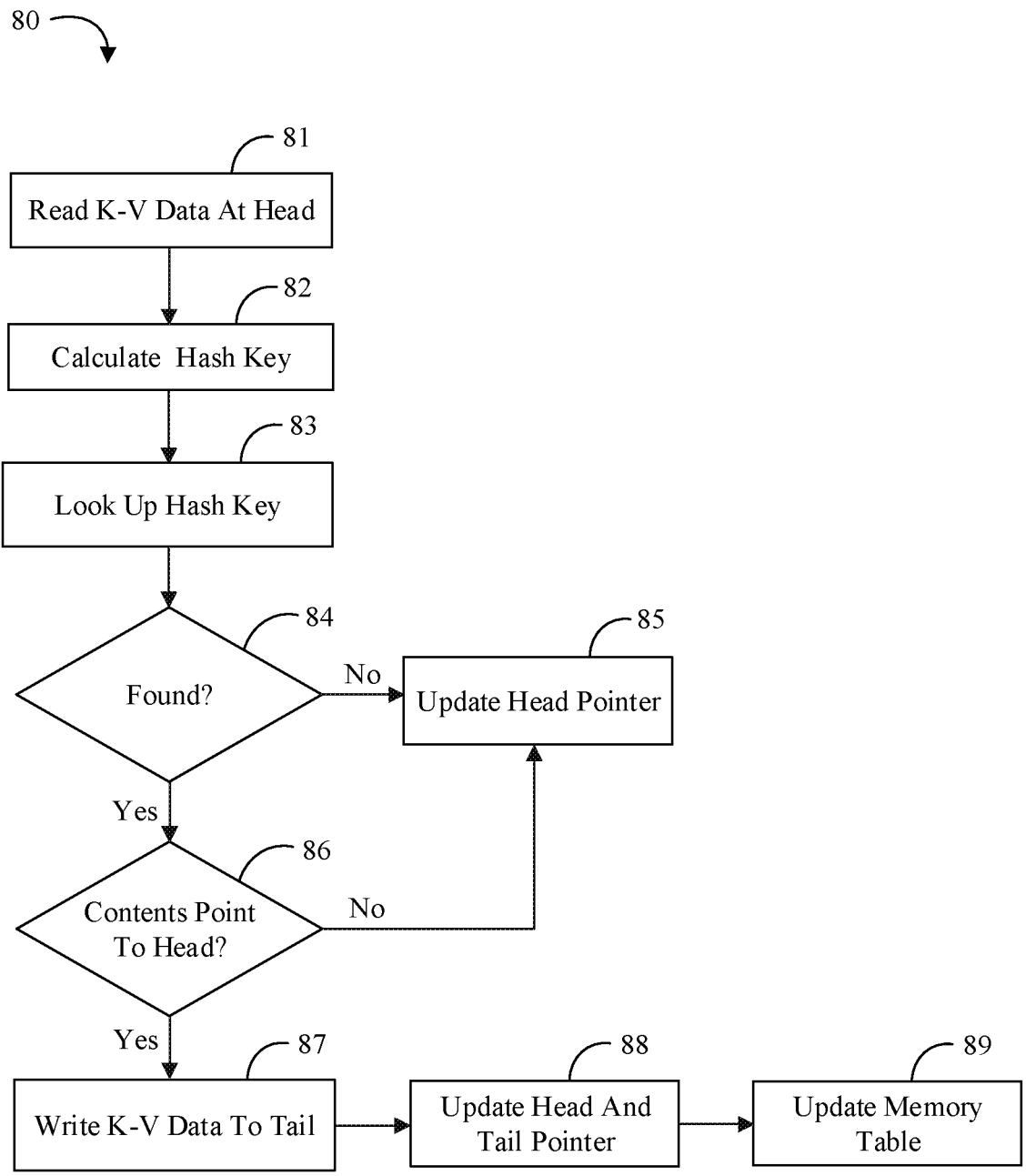
FIG. 8 is a flowchart of an example of a method of performing a garbage collection operation according to an embodiment.

Turning now to FIG. 8, an embodiment of a method 80 of performing a garbage collection operation may read metadata and value information for a K-V pair from the head of the log at block 81. The method 80 may then calculate the hash key at block 82 and look up the hash value in the memory binary tree at block 83. If the hash key is not found at block 84, the log head pointer may be updated to release the entry at block 85. If the hash key is found at block 84, the method 80 may check if the memory content points to the log head address at block 86. If the memory content does not point to the log head address at block 86, the log head pointer may be updated to release the entry at block 85. If the content is the same as the disk value at block 86, the method 80 may then write the metadata and/or value information to the tail of log at block 87 and the log head and tail pointer may be updated at block 88. The method 80 may then update the memory table entry to point to the new disk address of this entry at block 89.

Before a clean shutdown, in some embodiments, the full memory tree, free memory entry list, and disk circular log header/tail pointer may be stored to a dedicated backup space of disk. After reboot, the status of this backup space may first be read from disk. If the status is valid, the backup space may be read from disk to load the memory tree and free entry list, and then the status may be changed to invalid. If the read status result is invalid, a fast crash recovery mechanism as discussed below may be used to recover the data.

Some embodiments may include a fast recovery log. For example, a circular buffer may be reserved on a dedicated space of disk to log the in-memory table update and delete from both UPDATE/DELETE commands and garbage collection. Each entry of this circular log may include timestamp, HASH(KEY), LBA, offset, length, status/operation of each memory table change. The size of this log may be larger than two times (2×) of a maximum entry number of the disk to ensure all valid entry's memory table structure may be logged. Accordingly, new data may always be appended to the tail of the circular log without checking the log fullness. The fast recovery log may be appended when: 1) an UPDATE command creates or updates a memory table entry; 2) a DELETE command deletes a memory table entry; and/or 3) a garbage collection operation updates a memory table entry. The log can be flushed in to disk after a programmable number of append operations or before power-off.

In accordance with some embodiments, crash recovery may include slow crash recovery and/or fast crash recovery. Because the index may only be stored in system memory, all index information may be lost after a system crash or unexpected power off. After reboot, a new in-memory table may be rebuilt from the disk log.

In some embodiments, slow crash recovery may be performed by reading whole data circular log. For example, the circular data log may be read from the beginning to the end. The memory binary tree may be rebuilt from each entry read from disk. The full disk scan time may correspond to the full disk sequential read time (e.g., for a 2TB SSD, it may be about 10 min).

In some embodiments, a fast crash recovery may use the fast recovery log. For example, the fast recovery log may be scanned from beginning to end to rebuild the memory binary tree. The last memory table update or create operation may be found using the timestamp field of the fast recovery log. The data log may be scanned from the location found in the preceding operation to recover the memory entries that were not flushed into the fast recovery log.

ADDITIONAL NOTES AND EXAMPLES

Example 1 may include an electronic processing system, comprising a processor, a system memory communicatively coupled to the processor, a solid state drive communicatively coupled to the processor, a logger communicatively coupled to the processor and the solid state drive to log memory access data in the solid state drive, a log indexer communicatively coupled to the logger to index the memory access log data in the system memory in an index table, and a key compressor communicatively coupled to the log indexer to compress an index key for the index table.

Example 2 may include the system of Example 1, wherein the logger is further to maintain the memory access log data in a circular log.

Example 3 may include the system of Example 2, wherein the logger is further to store metadata and value information for key-value pairs sequentially in a full disk log.

Example 4 may include the system of Example 2, wherein the index table stored in the system memory comprises entries for all key-value pairs in the circular log.

Example 5 may include the system of any of Examples 1 to 4, wherein the compressed index key comprises a hash of a full key.

Example 6 may include the system of any of Examples 1 to 4, wherein the key compressor is further to identify a conflict in two or more compressed index keys, and combine key-value pairs corresponding to the conflicted compressed index keys into a new entry.

Example 7 may include a memory apparatus, comprising a logger to log memory access data in persistent storage media, a log indexer communicatively coupled to the logger to index the memory access log data in an index table in a system memory, and a key compressor communicatively coupled to the log indexer to compress an index key for the index table.

Example 8 may include the apparatus of Example 7, wherein the logger is further to maintain the memory access log data in a circular log.

Example 9 may include the apparatus of Example 8, wherein the logger is further to store metadata and value information for key-value pairs sequentially in a full disk log.

Example 10 may include the apparatus of Example 8, wherein the index table comprises entries for all key-value pairs in the circular log in the system memory.

Example 11 may include the apparatus of any of Examples 7 to 10, wherein the compressed index key comprises a hash of a full key.

Example 12 may include the apparatus of any of Examples 7 to 10, wherein the key compressor is further to identify a conflict in two or more compressed index keys, and combine key-value pairs corresponding to the conflicted compressed index keys into a new entry.

Example 13 may include a method of logging memory information, comprising logging memory access data in persistent storage media, indexing the memory access log data in an index table in a system memory, and compressing an index key for the index table.

Example 14 may include the method of Example 13, further comprising maintaining the memory access log data in a circular log.

Example 15 may include the method of Example 14, further comprising storing metadata and value information for key-value pairs sequentially in a full disk log.

Example 16 may include the method of Example 14, further comprising storing index table entries for all key-value pairs from the circular log in the system memory.

Example 17 may include the method of any of Examples 13 to 16, further comprising hashing a full key to provide the compressed index key.

Example 18 may include the method of any of Examples 13 to 16, further comprising identifying a conflict in two or more compressed index keys, and combining key-value pairs corresponding to the conflicted compressed index keys into a new entry.

Example 19 may include at least one computer readable medium, comprising a set of instructions, which when executed by a computing device, cause the computing device to log memory access data in persistent storage media, index the memory access log data in an index table in a system memory, and compress an index key for the index table.

Example 20 may include the at least one computer readable medium of Example 19, comprising a further set of instructions, which when executed by a computing device, cause the computing device to maintain the memory access log data in a circular log.

Example 21 may include the at least one computer readable medium of Example 20, comprising a further set of instructions, which when executed by a computing device, cause the computing device to store metadata and value information for key-value pairs sequentially in a full disk log.

Example 22 may include the at least one computer readable medium of Example 20, comprising a further set of instructions, which when executed by a computing device, cause the computing device to store index table entries for all key-value pairs from the circular log in the system memory.

Example 23 may include the at least one computer readable medium of any of Examples 19 to 22, comprising a further set of instructions, which when executed by a computing device, cause the computing device to hash a full key to provide the compressed index key.

Example 24 may include the at least one computer readable medium of any of Examples 19 to 22, comprising a further set of instructions, which when executed by a computing device, cause the computing device to identify a conflict in two or more compressed index keys, and combine key-value pairs corresponding to the conflicted compressed index keys into a new entry.

Example 25 may include a memory apparatus, comprising means for logging memory access data in persistent storage media, means for indexing the memory access log data in an index table in a system memory, and means for compressing an index key for the index table.

Example 26 may include the apparatus of Example 25, further comprising means for maintaining the memory access log data in a circular log.

Example 27 may include the apparatus of Example 26, further comprising means for storing metadata and value information for key-value pairs sequentially in a full disk log.

Example 28 may include the apparatus of Example 26, further comprising means for storing index table entries for all key-value pairs from the circular log in the system memory.

Example 29 may include the apparatus of any of Examples 25 to 28, further comprising means for hashing a full key to provide the compressed index key.

Example 30 may include the apparatus of any of Examples 25 to 28, further comprising means for identifying a conflict in two or more compressed index keys, and means for combining key-value pairs corresponding to the conflicted compressed index keys into a new entry.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
a system memory communicatively coupled to the processor;
a solid state drive communicatively coupled to the processor;
a logger communicatively coupled to the processor and the solid state drive, the logger including logic to log memory access data in the solid state drive;
a log indexer communicatively coupled to the logger, the log indexer including logic to index the memory access log data in the system memory in an index table; and
a key compressor communicatively coupled to the log indexer, the key compressor including logic to:
compress an index key for the index table,
identify a conflict in two or more compressed index keys,
append the compressed index key to the index table when a check of metadata determines a full key match and when the check of metadata confirms authorization after the full key match, and
combine key-value pairs corresponding to the conflicted compressed index keys into a new entry when the check of metadata does not determine the full key match.

2. The electronic processing system of claim 1, wherein the logger includes logic further to maintain the memory access log data in a circular log.

3. The electronic processing system of claim 2, wherein the logger includes logic further to store metadata and value information for key-value pairs sequentially in a full disk log.

4. The electronic processing system of claim 2, wherein the index table stored in the system memory comprises entries for all key-value pairs in the circular log.

5. The electronic processing system of claim 1, wherein the compressed index key comprises a hash of a full key.

6. A memory apparatus, comprising:
a logger including logic to log memory access data in persistent storage media;
a log indexer communicatively coupled to the logger, the log indexer including logic to index the memory access log data in an index table in a system memory; and
a key compressor communicatively coupled to the log indexer, the key compressor including logic to:
compress an index key for the index table,
identify a conflict in two or more compressed index keys,
append the compressed index key to the index table when a check of metadata determines a full key match and when the check of metadata confirms authorization after the full key match, and
combine key-value pairs corresponding to the conflicted compressed index keys into a new entry when the check of metadata does not determine the full key match.

7. The memory apparatus of claim 6, wherein the logger includes logic further to maintain the memory access log data in a circular log.

8. The memory apparatus of claim 7, wherein the logger includes logic further to store metadata and value information for key-value pairs sequentially in a full disk log.

9. The memory apparatus of claim 7, wherein the index table comprises entries for all key-value pairs in the circular log in the system memory.

10. The memory apparatus of claim 6, wherein the compressed index key comprises a hash of a full key.

11. A method of logging memory information, comprising:
logging memory access data in persistent storage media;
indexing the memory access log data in an index table in a system memory;
compressing an index key for the index table;
identifying a conflict in two or more compressed index keys;
appending the compressed index key to the index table when a check of metadata determines a full key match and when the check of metadata confirms authorization after the full key match; and
combining key-value pairs corresponding to the conflicted compressed index keys into a new entry when the check of metadata does not determine the full key match.

12. The method of claim 11, further comprising:
maintaining the memory access log data in a circular log.

13. The method of claim 12, further comprising:
storing metadata and value information for key-value pairs sequentially in a full disk log.

14. The method of claim 12, further comprising:
storing index table entries for all key-value pairs from the circular log in the system memory.

15. The method of claim 11, further comprising:
hashing a full key to provide the compressed index key.

16. At least one non-transitory computer readable medium, comprising a set of instructions, which when executed by a computing device, cause the computing device to:
log memory access data in persistent storage media;
index the memory access log data in an index table in a system memory;
compress an index key for the index table;
identify a conflict in two or more compressed index keys;
append the compressed index key to the index table when a check of metadata determines a full key match and when the check of metadata confirms authorization after the full key match; and
combine key-value pairs corresponding to the conflicted compressed index keys into a new entry when the check of metadata does not determine the full key match.

17. The at least one non-transitory computer readable medium of claim 16, comprising a further set of instructions, which when executed by a computing device, cause the computing device to:
maintain the memory access log data in a circular log.

18. The at least one non-transitory computer readable medium of claim 17, comprising a further set of instructions, which when executed by a computing device, cause the computing device to:
store metadata and value information for key-value pairs sequentially in a full disk log.

19. The at least one non-transitory computer readable medium of claim 17, comprising a further set of instructions, which when executed by a computing device, cause the computing device to:
   store index table entries for all key-value pairs from the circular log in the system memory.

20. The at least one non-transitory computer readable medium of claim 16, comprising a further set of instructions, which when executed by a computing device, cause the computing device to:
   hash a full key to provide the compressed index key.

* * * * *